Aug. 14, 1923.
E. F. MITCHELL
1,464,681
SAFETY RAZOR BLADE HOLDER
Filed Feb. 13, 1922
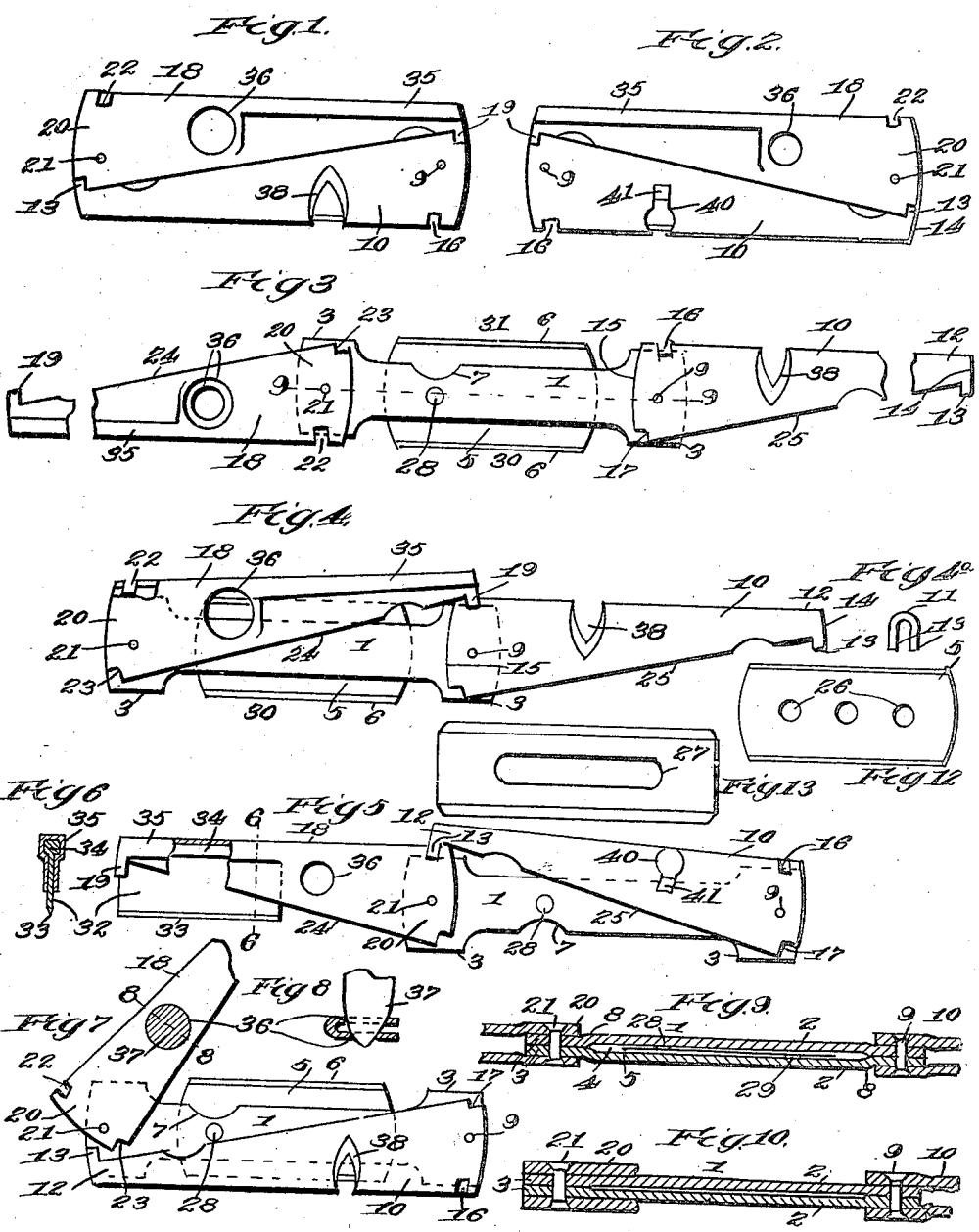
INVENTOR
Eugene F. Mitchell
BY
Carl M. Crawford
ATTORNEY Patented Aug. 14, 1923.

1,464,681

UNITED STATES PATENT OFFICE.

EUGENE F. MITCHELL, OF SPOKANE, WASHINGTON, ASSIGNOR TO FRANK R. ROBERTSON, OF SPOKANE, WASHINGTON.

SAFETY-RAZOR-BLADE HOLDER.

Application filed February 13, 1922. Serial No. 536,283.

*To all whom it may concern:*

Be it known that I, EUGENE F. MITCHELL, a citizen of the United States, residing at Spokane, in the county of Spokane and State of Washington, have invented certain new and useful Improvements in Safety-Razor-Blade Holders, of which the following is a specification.

This invention relates to improvements in devices for holding the blades of safety razors.

In one utility, the device of this invention is designed for use as a "pocket piece" with an old or worn out blade inserted therein, the blade being useful in various utilities such as sharpening pencils, clipping the ends of cigars, or for other purposes for which a sharp cutting edge is useful. When the device is in this character of adjustment, the cutting edges of the blade are normally guarded or enclosed so that the device may be carried in the pocket without danger, parts being openable when it is desired to make use of the blade, and the latter being readily removable from the device when it is desired to use the blade independently.

This improved device is also adapted for use in holding blades when stropping the same, and in this connection, the device is designed to hold any type of flat blade, now on the market, and also those types of blades having an enlargement extending parallel with one cutting edge.

In the most improved embodiment, the invention includes a blade holding section and handle sections movably or pivotally associated with the holding section in such a manner that the handle sections can be folded into contracted or closed relation to the holding section, or into extended or projecting positions with respect thereto. It is a feature of this invention to provide the holding and handle sections with means whereby when one handle section is folded against the holding section it will not only cause the latter to tightly grip the blade, but also whereby the folded and projecting handle sections will so coact that the projecting section will be locked in a projecting adjustment to act as a handle when stropping a blade.

A further feature consists in providing one handle section with means for holding a type of blade not insertable in the holding section, the remaining handle section being foldable into closed relation with the normally holding section and into locking relation with the blade holding handle section, whereby the folded handle section and the normally blade holding sections will function as a handle in stropping the blade held by the projected handle section.

Other features and objects of the invention will be more fully described in connection with the accompanying drawing and will be more particularly pointed out in and by the appended claims.

In the drawing:—

Figure 1, is a view in elevation showing one side of the device when the latter is completely folded.

Figure 2, is a view in elevation of the opposite side from that shown in Figure 1.

Figure 3, is a view in side elevation with the handle sections adjusted into an extended position to illustrate the structure.

Figure 4, is a view showing a blade inserted into the holding section and illustrating how one handle section may be folded while the other is in a projecting position to form a handle in stropping the blade.

Figure 4ª is an end view looking from the right of Figure 4, to illustrate the U-form of handle section.

Figure 5, shows the manner of adjusting the device when stropping a blade that is not insertable into the holding section but which is held in one of the handle sections.

Figure 6, is a sectional view on line 6—6 of Fig. 5.

Figure 7, shows the manner in which the end of a cigar can be clipped off.

Figure 8, is a sectional view on line 8—8 of Fig. 7.

Figure 9, is a sectional view on line 9—9 of Fig. 3.

Figure 10, is a similar view with the parts in a slightly different adjustment.

Figure 11, is a view showing how the device can be employed to sharpen a pencil.

Figure 12, is a side view of a Gillette blade.

Figure 13, is a view of a slotted blade.

Like characters of reference designate similar parts throughout the different figures of the drawing.

Reference will first be made to the blade holding section which is generally designated at 1 and which is shown composed of two strips of metal 2, having enlarged ends 3. Between the ends 3, the strips are slightly bowed in parallel relation to form an intervening space 4, to receive an interposed blade 5. This space 4 is greatly exaggerated for purposes of clearness of illustration. It will be seen that the narrow portion of the holding section is proportioned to longitudinally embrace the blade 5, between the cutting edges 6, thereof, thereby leaving said edges exposed, as clearly shown in Figure 3. The blade 5, is the Gillette razor blade but the length of the holding section is sufficiently in excess with respect to the length of this blade to receive other and longer blades of the flat type. The blade is held, preferably by friction, and by coaction with openings in the blade, therefore, this feature makes the holder universally adapted for all types of flat blades now on the market. It will be noted that the strip members of which this holding section is formed, are provided with registering recesses or notches 7, for a purpose which will later appear. Shoulders 8, are also formed on the outer faces of said strips, which will later be described. In the position shown in Figure 9, the blade 5 can readily be inserted, and in the position shown in Figure 10, the blade is securely clamped in position.

Associated with and preferably pivoted at one end at 9, is one of a pair of companion handle sections. This handle section is formed of a strip of metal bent upon itself at 11, along its length, to afford a cross section of U-shaped form with one long side and both ends open. It will be noted that the section 10 tapers from the pivoted or butt-end toward its free end 12. The free end 12 terminates in locking lugs 13 which are struck from the pivot 9, as a center. The end edge 14 is likewise struck from such center, and the butt-edge 15 is on a like radious so that when the sections are folded, as shown in Figures 1 and 2, the ends of the device will be rounded. A locking notch 16 is formed in the bight of section 10 near the butt-end and the walls of said notch are struck from a center of the same length of radii as the lugs 13, as will later appear. On the free edges near the butt-end 15, notches 17, are formed for receiving the locking lugs of the companion section when the sections are folded as shown in Figure 1.

The companion handle section 18 is substantially identical in form and size with respect to section 10, the minor differences in structure being immaterial to the action of said section 18 in its relation to section 10. Thus, section 18, has locking lugs 19 and is of U-shaped cross section and has its butt-end 20, pivoted at 21, to the remaining end of said holding section 1. It also has locking notches 22 and receiving notches 23, although it will be noted that section 18, is reversely disposed with respect to section 10, the open side edge 24 facing in a direction opposite to the open side edge 25, of section 10.

Reference will next be made to the means whereby the handle sections coact with the holding section to grip the blade, and I will revert back to the holding section to describe a feature whereby the blade is not only frictionally but positively secured and anchored in the holding section.

The Gillette blade, as shown in Figure 12, has openings 26, and other types of blades have a single slot, as shown at 27, in Figure 13. The Gillette blade is the shortest now on the market, and consequently, if the feature of anchorage which I am now about to describe will register with the Gillette blade, it will also register with longer blades. I provide the strip members of section 1 with anchorage studs 28 and 29, which are spaced a distance equal to the spacing of openings 26, to register therewith. These studs may be formed by up-setting the stock of said strips and the depth of projection of said studs 28 and 29, into space 4, is half the thickness of the razor blade, approximately, so that when the strips are in spaced relation, as shown in Figure 9, these studs will not have such a degree of projection as would bar entrance of the blade, with one of the cutting edges foremost, thereby dulling or injuring such edge. If a slotted blade is to be held, then these studs 28 and 29 will enter the slot, as indicated at 27. In any event, when these studs have entered the openings or the slot, and after the blade has been frictionally engaged, then, the cutting edges will project on opposite sides of the holding section 1, at absolutely uniform distances. This is the important feature, as if in the use of a slotted blade, the latter should not be exactly central longitudinally of section 1, this would not matter. Further, in the use of a slotted blade, the frictional grip of the section 1, is relied upon to prevent any endwise displacement of the blade. Thus, I have shown a combined friction and positive anchorage for the blade.

Now it will be seen that the butt-ends of the handle sections are hinged to the holding section in forked relation with respect to the latter and as shown in Figure 9, the sections 10 and 18, are in a releasing position, as illustrated in Figure 3. If one of the handle sections is adjusted or folded onto the holding section, as indicated in Figure 4, then the walls of section 18, will ride over shoulders 8 thereby pinching or clamping the members of the holding section toward each other. This not only results in frictionally binding the blade, but also in projecting the studs 28 and 29 either into opening 26, or into slot 27, dependent on the type of blade used, thus securely anchoring the latter with its cutting edges exposed on opposite sides for stropping purposes. In the adjustment shown in Figure 4, section 10 serves as the handle, in stropping, and both sides of edge 30, can be stropped. If a reverse adjustment is effected of handles 10 and 18, then, both sides of the opposite edge 31, can be stropped.

Because of the fact that the handle sections are pivotally mounted, it is necessary to securely hold them in their adjusted positions, a feature which I will next describe.

In Figure 4, the lugs 19, engage the notches 16, and as the edges of both are struck from pivot 21, as a center, the adjustment of said sections into this position, will serve to lock them against release from this position. The same is true of a reverse adjustment, either handle section being adapted to form the handle. Of course, it will be understood that the sections are pivoted in relatively tight engagement with each other in order to make this improved locking feature effective.

In order to make the device effective in stropping a one edge blade with an enlarged back, I provide the following means.

This type of blade 32, has a single cutting edge 33, and an elongated shoulder 34. I channel the section 18, at 35, to permit this type of blade to slide in endwise of said section, as clearly shown in Figures 5 and 6. In this utility, the section 18 is adjusted into a projected position and the section 10 is adjusted into a contracted or folded position and forms with the holding section 1, the handle whereby the blade 32 may be stropped. Of course, the lugs 13, enter the notches 22, thereby locking the sections 10 and 18 in the position shown.

After a blade has been stropped and removed from the device, an old blade can be inserted and the handle sections can be both folded into enveloping relation with the blade and section 1, as shown in Figures 1 and 2, in which the device functions as a "pocket piece" carrier for the old blade. This renders such blade always accessible for any of the various uses to which it may respond. It will be noted that both cutting edges are entirely enclosed and guarded, and the device, in this reduced size can conveniently be carried in the pocket without danger. This is one of the distinct utilities of the device.

With the old blade in position, I will next describe how the device can be used as a cigar cutter.

Section 18, is provided with registering openings 36, one slightly larger than the other, to receive the end 37 of a cigar. With the section 18 partly projected, as shown in Figure 7, it is merely necessary to close said section against section 1, and as the blade edge enters between the walls of section 18, the end of the cigar will be severed. It will be seen that the whole device enters into the performance of this function as this operation could not effectively be performed unless the blade was positively held by the coaction of sections 1 and 10.

I will next describe how the device can be used to sharpen a pencil.

Section 10 has a transverse notch which on one side takes the form shown at 38, to receive the tapered part of the pencil 39. On the opposite side, the notch takes the form shown at 40. To permit of discharge of the cuttings, I provide a deflecting lip 41, which curves inwardly against the blade, as shown in Figure 11, to deflect the cuttings from entering between that wall of section 10 and the blade and thereby forming an objectional obstruction. Thus, both edges of the used blade are exposed, for limited lengths, for separate and useful purposes.

It is believed that the invention will be clearly understood from the foregoing, and while I have shown one specific form of the invention, I do not wish to be limited thereto except for such limitations as the claims may import.

I claim:—

1. A safety razor blade holder comprising a central holding section, companion handle sections pivoted to said holding section and each having means when in a contracted adjustment for coaction with said holding section to cause the latter to tightly grip the blade, the remaining handle section being adapted for adjustment into a projecting position to form a handle for the holder when stropping the blade, and said projected and contracted handle sections having coacting means for locking the projecting handle section in a fixed projecting position.

2. A safety razor blade holder comprising a central holding section, companion handle sections having their butt-ends pivoted to the ends of said holding section and each having means when in a contracted adjustment against said holding section to cause the latter to tightly grip a blade, the remaining handle section being adapted for adjustment into a projecting position to form a handle for the holder when stropping a blade, and the free end of the contracted section having means engaging the butt-end of the projecting section to lock the latter in a projecting position.

3. A safety razor blade holder comprising a central blade holding section, companion handle sections of substantially identical form pivoted to said holding section and each having means when in a contracted adjustment for causing said holding section to tightly grip a blade, the remaining handle section being adapted to form a handle for the holder when stropping a blade, and said handle sections having elements coacting with each other to hold said handle sections in their adjusted positions.

4. A safety razor blade holder comprising a blade holding section, companion handle sections pivoted to said holding section having coacting means whereby when one handle section is adjusted into projecting and the other into contracted relation to said holding section said handle sections will be held in their adjusted positions.

5. A safety razor blade holder comprising a blade holding section, companion handle sections of substantially identical form having their butt-ends pivoted to said holding section and each being adapted for adjustment into a projecting position to form a handle when stropping a blade, the remaining handle section being adapted for adjustment into a contracted position, and said handle sections having coacting elements on their free and butt-ends for locking said handle sections in their adjusted positions.

6. A safety razor blade holder comprising a blade holding section split for embracing a safety razor blade between the cutting edges thereof, handle sections of U-shaped cross section having their butt-ends pivoted in forked relation to the ends of said holding section and each handle section being adapted to partially embrace said holding section and proportioned to pinch the latter when adjusted into contracted relation with said holding section thereby causing the latter to tightly grip the interposed blade, the remaining handle section being adapted for adjustment into a projecting position to form a handle when stropping the blade.

7. A safety razor blade holder comprising a blade holding section split for embracing a safety razor blade between the opposite cutting edges thereof, handle sections of U-shaped cross section having their butt-ends pivoted to the ends of said holding section in forked relation and each handle section being adapted to partially embrace said holding section and proportioned to pinch the latter when adjusted into contracted relation with respect to said holding section thereby causing the latter to tightly grip the interposed blade, the remaining handle section being adapted for adjustment into a projecting position to form a handle when stropping the blade, the butt-ends and free ends of said handle sections having coacting elements whereby the free end of the contracted section will engage the butt-end of the projected section to lock both sections in their adjusted positions.

8. A safety razor blade stropping holder comprising a holding section, and handle sections therefor of substanitally identical form for selective adjustment into contracted and projecting positions with respect to said holding section.

9. A safety razor blade holder comprising a blade holding section, handle sections pivoted to said holding section and each having means when in a contracted adjustment for causing said holding section to tightly grip the blade, the remaining handle section being adapted for adjustment into a projecting position to form a handle when stropping the blade.

10. A safety razor blade holder comprising a blade holding section for gripping a safety razor blade between the cutting edges thereof leaving said edges normally exposed, and symmetrically proportioned sections of U-shaped cross section pivoted to said holding section in forked relation with the ends of the latter and adapted to be closed against each other in edge to edge engagement and in enveloping relation about said holder section and the blade held thereby.

11. A holder for safety razor blades comprising a central section, and handle sections pivoted to said central section and one of said handle sections having means for holding a blade independently of said central section.

12. A holder for safety razor blades comprising a blade holding section for one type of blade, handle sections pivoted to said holding section and one of said handle sections having means for holding a type of blade different from the type of blade insertable in said blade holding section, said handle sections having means whereby the blade holding handle section may be locked in a projected position.

13. A holder for safety razor blades comprising a blade holding section for holding one type of blade, handle sections pivoted to the ends of said blade holding section and foldable thereagainst or into projecting positions with respect thereto, one of said handle sections having blade holding means for holding a type of blade not insertable into said blade holding section, said handle sections having means whereby the blade holding handle section may be locked in a projecting position with the remaining handle section folded against and along side of said blade holding section to form a handle while stropping the blade in the blade holding handle section.

14. A safety razor blade holder for blades having one or more openings, comprising a holding section including strips spaced apart when in a blade releasing position to slightly more than the thickness of a blade to permit insertion of the latter, and each strip having one blade holding stud projecting into said space to an extent approximately half the thickness of the blade to permit insertion of the latter without injury to the cutting edge, and said holder having means for closing said strips against an interposed blade to force said studs into the perforations of the latter.

15. A safety razor blade holder comprising a blade holding section, a handle section pivoted to each end of said holding section and one handle section being adjustable against one side of said holding section and the remaining handle section being adjustable against the opposite side of said holding section whereby either handle section may be used as a handle for the holder in stropping a blade.

16. A safety razor blade holder comprising a holding section for the blade, a handle section pivoted to each end of said holding section, the pivoted end of each handle section having an arched notch struck from the pivot of the remaining section as a center, and the free end of each handle section having an arched lug struck from the pivot on which it is connected as a center, whereby the lug of a folded handle section engaging the notch of a projected handle section will lock the latter in a projected adjustment.

In testimony whereof I hereby affix my signature.

EUGENE F. MITCHELL.